United States Patent Office 2,701,252
Patented Feb. 1, 1955

2,701,252

ISOINDOLENINE COMPOUNDS

Heinrich Vollmann, Leverkusen-Wiesdorf, and Fritz Baumann and Berthold Bienert, Leverkusen-Bayerwerk, Germany, assignors to Farbenfabriken Bayer Aktiengesellschaft, Leverkusen, Germany, a corporation of Germany No Drawing. Application June 25, 1952,
Serial No. 295,554

Claims priority, application Germany June 28, 1951

12 Claims. (Cl. 260—325)

The present invention relates to new chlorine containing derivatives of isoindolenine. Furthermore the invention relates to the manufacture of isoindolenine compounds, more particularly to the manufacture of derivatives of 1-amino-3-imino-isoindolenine.

According to the invention new chlorine containing compounds are obtained by treating phthalimide or nuclear substitution products thereof, for instance halogen-, nitro-, alkyl- or aryl derivatives, with phosphorus pentachloride. Instead of phthalimides as such starting materials may be used which are converted into phthalimide under the reaction conditions, for instance o-cyanobenzoic acid and its chloride.

The reaction is carried out by heating the reactants, preferably in a solvent indifferent to phosphorus pentachloride, such as phosphorus oxychloride, chlorobenzene or o-dichlorobenzene. By reacting 1 mol of PCl$_5$ and 1 mol of dicarboxylic acid imide (I), 1-chloro-3-oxo-isoindolenine (II) is obtained as main product. 2 mols of PCl$_5$ yield 1.3.3-trichloro-isoindolenine (III):

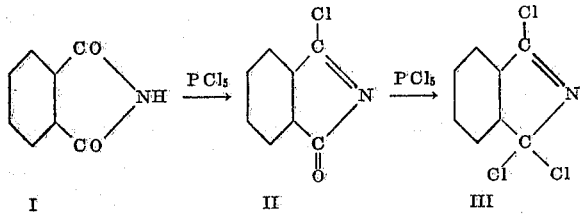

I  II  III

Both compounds have been unknown up to the present date. They are colourless and can be distilled in vacuo without decomposition. The product II boils at 159°–160° C. under 14 mm. pressure, the product III at 130° C. under 7 mm. pressure. Both products crystallize well from cyclohexane if moisture is completely excluded. Product II yields long needles of M. P. 77°–78° C., while product III yields coarse, flat, rhombic crystals of the M. P. 106°–107° C.

It is possible, of course, to use in the above reaction substitution products of phthalimides; for instance nitrophthalimides, chlorine or bromine substituted phthalimides, phenyl phthalimides and alkyl substituted phthalimides. In this case substituted chlorine containing isoindolenine derivatives are obtained.

Apart from the aforesaid reaction products, other reaction products the composition of which has not been determined as yet are formed in part as initial products and in part as stable by-products. Such by-products are described in Examples 2 and 3; they are more easily produced when the reaction is conducted at higher temperatures. No by-products are formed in the reaction of phthalimides which are substituted by acid radicals, for instance 4-nitro- or tetrachloro phthalimide.

The new compounds obtained according to the invention contain very readily exchangeable chlorine. They readily react with other compounds containing exchangeable hydrogen or metallic atoms and therefore may be used for a number of organic syntheses. Thus for instance 1,3,3-trichloro-isoindolenine yield 1-amino-3-imino-isoindolenine or derivatives thereof with ammonia or amines.

The chlorine containing derivatives of isoindolenine, which contain more than one reactive chlorine atom, can be converted into 1-amino-3-imino-isoindolenines or N-substitution products thereof with ammonia, amines or other nitrogen containing compounds like hydroxylamine, sulphonic acid amides and carboxylic acid amides. The reaction is preferably carried out at lower temperatures (for instance from −30° C. to +70° C.) or with cooling and in an indifferent solvent, and advantageously in the absence of water because of the water-sensitivity of the chlorine containing compounds. As solvents may be used aromatic or hydroaromatic hydrocarbons or their chlorine substitution products. Suitable amines are primary and secondary aliphatic, cycloaliphatic and aromatic amines, for instance methylamine, ethylamine, cyclohexylamine, aniline and dimethylamine. The chlorine containing compounds employed as starting materials need not be isolated from their reaction solutions and purified. It is possible, however, to employ directly in the reaction the by-products liberated from the reaction of phosphorus pentachloride, for instance phosphorus oxychloride.

Isolation of 1-amino-3-imino-isoindolenines obtained according to the process of the present invention can be effected in the usual manner by filtering off after the treatment with ammonia or derivatives thereof, as far as they precipitate from the reaction solution, or liberating them from the water-soluble hydrochlorides by washing with water. They can of course also be precipitated from the reaction solutions in the form of their slightly soluble salts, for instance as nitrates. The derivatives of 1-amino-3-imino-isoindolenine, some of which crystallize from aqueous solutions, are valuable intermediate products in the synthesis of phthalocyanines.

The present invention is further illustrated by the following examples the parts being by weight:

Example 1

A mixture of 147 parts of phthalimide and 430 parts of phosphorus pentachloride is heated under reflux to 95°–100° C. while stirring, with 400 parts of o-dichlorobenzene. The phthalimide dissolves with a light yellow colouration and evolution of HCl, within 70–80 minutes. After stirring the solution at about 100° C. for another 4 hours the phosphorus oxychloride produced is distilled off under gradually decreasing pressure, and thereafter the o-dichlorobenzene at 75°–85° C. under 37–17 mm. pressure whereby traces of the phosphorus pentachloride which is used in slight excess distil over. At a transition temperature (under 17 mm. pressure) of 102° C., the distillate begins to partially solidify in a crystalline form. After the distillate formed in the range of 102°–146° C. which finally completely solidifies and represents about 25 parts—the major part of distillate follows at 160–165° C. under 17–19 mm. pressure (133 parts corresponding to 95% of theory). The colourless product collects partly in the liquid state and partly in the water-cooled receiver as a sublimate of coarse crystals. The distillation is complete when the distillate turns yellow. The solidification point is about 102° C. A yellow-brown residue remains which is viscous when hot (about 57 parts).

Upon redistillation of the reaction product in vacuo it becomes completely colourless and is obtained almost pure. The product which boils at 157–158° C. under 19 mm. pressure crystallizes from cyclohexane, with absolute exclusion of moisture, in colourless, coarse prismatic or rhombic crystals of the melting point 106–107° C. The product is free from phosphorus. According to the mode of production and chemical behaviour as well as to elementary analyses the reaction product represents 1.3.3-trichloro-isoindolenine (Formula III).

Phthalimide is obtained from the reaction product III with evolution of HCl on adding water, or by heating with methanol, ethanol and acetic acid. The reaction with ammonia leads to 1-amino-3-imino-isoindolenine in an almost quantitative yield. Further definite reaction products are obtained with primary and secondary amines, even with pyridine.

By adding dry ammonia gas to the solution of 11 parts of 1.3.3-trichloro-isoindolenine in 80 parts of benzene while cooling at 20–50° C. and stirring the solution until the ammonia gas is present in excess a colourless crystal paste is formed which contains apart from benzene which may be separated by evaporating or filtering, and ammonium chloride, 1-amino-3-imino-isoindolenine which crystallizes in part from the aqueous solution in colourless needles. By adding ammonium nitrate to the solution of the base in dilute acetic acid the latter is isolated in form of a colourless nitrate which is very difficultly soluble in water and methanol. The yield of dry nitrate amounts to about 8.9 parts corresponding to 83% of theory.

The same product is obtained by gradually running 11 parts of 1.3.3-trichloro-isoindolenine into excess alcoholic ammonia while the strong exothermic reaction is moderated by cooling. The resulting ammonium chloride precipitates. By diluting with water a clear solution forms from which the resulting base is easily precipitated and isolated in form of slightly soluble salts by addition of dilute nitric acid, phosphoric acid, perchloric acid, or oxalic acid.

By gradually introducing 11 parts of 1.3.3-trichloroisoindolenine into a solution of 23 parts of aniline in 100 parts of methanol a strongly exothermic reaction takes place and an intensely yellow coloured solution is formed from which the slightly water-soluble, egg-yolk hydrochloride of 1-phenylamino-3-phenylimino-isoindolenine precipitates by diluting the solution with hydrochloric acid (10%). The yield of the reaction product which can be easily isolated by filtering amounts to 16.3 parts corresponding to 98% of theory after drying in vacuo.

1-amino-3-imino-isoindolenine may also be obtained without isolation of the chlorine containing isoindolenine compounds in the following manner:

The crude 1.3.3-trichloro-isoindolenine obtained by reacting phthalimide and 2 mols of phosphorus pentachloride at a temperature substantially not exceeding 100° C. and liberated from phosphorus oxychloride formed by vacuum distillation, is dissolved in benzene and reacted with ammonia as described above.

After filtering off the resulting reaction product, drying and stirring with a little water and filtering once more a residue consisting substantially of 1-amino-3-iminoisoindolenine is obtained. Apart from the free base the residue contains the chloride of the base and phosphate. The product yields copper phthalocyanine by heating with copper acetate in a mixture of glycol and formamide.

*Example 2*

147 parts of phthalimide are refluxed while stirring with 208 parts of phosphorus pentachloride and 150 parts of o-dichloro-benzene. After about 20 minutes a light orange-yellow coloured solution forms at 130° C. The solution is stirred at 150° C. for a further 4 hours and the phosphorus oxychloride produced is distilled off under reflux up to an internal temperature of 205° C. and the o-dichloro-benzene is partly distilled off. Upon cooling a small quantity of a by-product crystallizes (5 parts of brownish-golden yellow needles which are soluble in concentrated sulphuric acid with an orange-red colouration). The by-product is clarified by filtering and the filtrate is distilled in vacuo. After removing the o-dichlorobenzene and the first runnings from 105° C. to about 143° C. (under 15 mm. pressure) about 50 parts of an almost colourles, but finally yellowish distillate are obtained. During distillation further phosphorus oxychloride goes over whereby a larger portion of the crude product decomposes with yellow-brown colouration.

By distilling the distillate once more a colourless product (B. P. 159–160° C. under 15 mm. pressure) is obtained which solidifies at 70°–73° C. in fine crystals. The product crystallizes from completely dry cyclohexane in long, bright needles having a sharp melting point (77–78° C.). By exposing to moist air and heating with methanol the product quickly changes to phthalimide. According to analysis and chemical behaviour the reaction product represents 1-chloro-3-oxo-isoindolenine (Formula II).

*Analysis.*—Calculated for $C_8H_4ONCl$: C, 58.0%; H, 2.4%; N, 8.64%; Cl, 21.4%. Found: C, 58.5%; H, 2.7%; N, 8.28%; Cl, 20.8%.

*Example 3*

A mixture of 1 mol of phthalimide, 2.08 mols of phosphorus pentachloride and o-dichlorobenzene, as described in example 1, is refluxed (at about 147° C.) after the reactants have completely dissolved whereby phosphorus oxychloride distils off in such a quantity that the internal temperature rises to 160° C. From about 150° C. slightly soluble, light yellow needles precipitate from the intensely yellow coloured solution; the amount of the precipitating needles increases during 3 hours subsequent heating. The mixture is then allowed to cool to 40–50° C. and filtered off at that temperature. The remaining loose felt of yellow needles is well washed with benzene and dried with exclusion of moisture. The yield amounts to about 20–25 parts of a by-product denoted for convenience as by-product A. Colourless coarse crystals precipitate from the filtrate of A on cooling overnight. The yield amounts to 12–15 parts of a by-product B.

By vacuum distillation as indicated in Example 1 the filtrate of B yields 1.3.3-trichloroisoindolenine in a yield of 50–60% of theory. The by-product A which is formed at higher temperatures only, contains chlorine and phosphorus but is free from oxygen. According to mean values of several conformable analyses the by-product A contains about 4.5% of P, 43.3% of C, 2.1% of H, 6.3% of N and (at least) 41% of Cl. The product dissolves in methanol with yellow colouration (with hydrolysis). The highly diluted solution shows a greenish-blue fluorescence. On heating with formamide the product changes to a full, red-orange coloured compound crystallizing from nitrobenzene in fine needles of the melting point 354° C. which dissolve in chloro-sulphonic acid with a green colouration and show both basic and acid properties. This compound is free from chlorine and phosphorus. Its composition corresponds to the formula $C_{16}H_{10}O_2N_2$.

The by-product A yields a well crystallized, red saponification and transformation product (melting point 236° C.) with potassium acetate in methanol; by heating in chlorosulphonic acid it is converted into the product described in the preceding paragraph (melting point 354° C.).

The by-product B crystallizes from chlorobenzene in colourless, coarse, bright rhombs of the melting point 206°–207° C. This product is free from phosphorus. According to analysis and behaviour the product should be 1.1'-bis-(3.3'-dichloroisonidolenyl)-ether.

*Example 4*

Into a mixture of 305 parts of phosphorus trichloride and 500 parts of phosphorus oxychloride chlorine is introduced with stirring and external cooling until the mixture is saturated and the excess chlorine is removed by means of a current of absolutely dry air. 285 parts of tetrachloro phthalimide are added in three portions with further stirring to the phosphorus pentachloride suspension formed and the mixture is heated to 110–115° C. under reflux. The second and third portion of the imide are introduced after the previously charged portions have dissolved. After 45 minutes the total quantity of the difficultly soluble imide is dissolved. The reaction is complete after heating for 2 hours. By cooling the solution which is not discoloured a substantial part of heptachloroisoindolenine crystallizes in pure form. It is preferable to distil first the phosphorus oxychloride and thereafter the heptachloroisoindolenine in vacuo. This product distils over at 208° C. under 6 mm. pressure. The distillate solidifies colourless in a crystalline form. The yield amounts to 358 parts corresponding to 84% of theory. By recrystalizing from completely dry benzene coarse, bright rhombs are obtained which become dull on drying in the vacuum desiccator with a slight flow of dry air. The product melts at 167°–168° C. According to the mode of manufacture, analysis and chemical behaviour the reaction product represents 1.3.3.4.5.6.7-heptachloroisoindolenine.

71.7 parts of distilled 1.3.3.4.5.6.7-heptachloroisoindolenine (B. P 208° C. under 6 mm. pressure) are dissolved in 1200 parts of dry benzene and the solution is stirred with ammonia gas while cooling at 20–30° C. A thick precipitate forms which is yellowish at the beginning and becomes colourless afterwards. When the adsorption of ammonia ceases the mixture is filtered by suction, the adhering benzene is separated by drying and the crude product is mixed while stirring with about 1000 parts of water, filtered off and washed with cold water to remove the ammonium chloride. The colourless to light grey residue is dried at vacuo up to 35° C. The yield of 1-amino-3-imino-4.5.6.7-tetrachloroisoindolenine is almost quantitative. The product becomes greenish by heating above 260° C. and melts at 295–300° C. with the evolution of gas. By heating the product to the boil in nitrobenzene in the presence of the calculated amount of suitable copper salts and with the addition of a little pyridine the slightly soluble, clear green perchloro-copper-phthalocyanine forms in a good yield. 1-amino-3-imino-4.5.6.7-tetrachloro-isoindolenine is insoluble in water, pyridine, methanol and other low boiling solvents. Conversion of the product takes place in high boiling media such as nitrobenzene, glycol or tetrahydro-naphthalene, while ammonia is split off. The product dissolves in moderately heated acetic anhydride from which an acetyl derivative crystallizes on cooling.

By adding excess aniline in drops to a benzene solution of 1.3.3.4.5.6.7-heptachloro-isoindolenine an intensely yellow coloured product precipitates. After shortly heating on the water-bath the mixture is cooled under reflux, filtered and the resulting aniline hydrochloride is washed with methanol. The residual 1-phenylamino-3-phenylimino-4.5.6.7-tetrachloro-isoindolenine is obtained in a completely pure state. It crystallizes from chlorobenzene in yellow needles of the M. P. 243–244° C., dissolves in concentrated sulphuric acid with a pure yellow colouration and forms a red-orange coloured, slightly soluble salt with concentrated hydrochloric acid.

*Example 5*

96 parts of 4-nitrophthalimide (melting point 199° C.) are mixed while stirring at 95–100° C. with 215 parts of phosphorus pentachloride and 300 parts of phosphorus oxychloride; a clear solution is obtained within 2–3 hours which is stirred at the same temperature for another 4 hours. Phosphorus oxychloride and subsequently the reaction product is distilled off in vacuo. 177 parts (corresponding to 89% of theory) of a light yellow viscous oil (constant boiling point 167–168° C. under 6 mm. pressure) are obtained. According to analysis and behaviour the oil represents an isomeric mixture of the 5-nitro- and 6-nitro-1.3.3-trichloro-isoindolenines. The product yields crystallized 4-nitrophthalimide by heating with methanol.

By reacting 264 parts of nitro-1.3.3-trichloro-isoindolenine in benzene with ammonia in analogous manner as described in Example 4, 215 parts (corresponding to 97% of theory) of chlorine-free 1-amino-3-imino-5-nitro-isoindolenine is obtained in form of a faintly yellowish powder. By heating the product with the calculated amount of copper-(I)-bromide in pyridine the known tetranitro-copper-phthalocyanine is obtained.

1-amino-3-imino-5-nitro-isoindolenine is slightly soluble only in cold water. The crude product becomes greenish at 200° C. and yields a blue-green melt with the evolution of gas at 223–224° C. The product purified by way of the difficultly soluble nitrate decomposes at about 245° C. By dissolving the nitro compound in a mixture of methanol and glacial acetic acid and precipitating after filtering with ammonium nitrate the slightly soluble nitrate is obtained as a weakly yellowish coloured crystalline powder which yields a brown melt on rapid heating without discolouration to green at 258–259° C. with the evolution of gas.

The product obtained by heating 1-amino-3-imino-nitro-isoindolenine with 2 mols of phenylhydrazine in glacial acetic acid yields an orange-yellow methanol solution which turns clear red-violet in the air after addition of sodium hydroxide solution.

By adding hydrosulfite to a cold aqueous alkaline suspension of 1-amino-3-imino-5-nitroisoindolenine the intensely yellow coloured, very easily water-soluble 1.5-diamino-3-imino-isoindolenine is obtained.

*Example 6*

By reacting 111.5 parts of 4 phenylpthalimide with phosphorus oxychloride and 215 parts of phosphorus pentachloride in the manner described in Example 5 the reactants dissolve with evolution of hydrochloric acid. The solution is however, deep brown-yellow coloured which indicates the formation of a relatively large proportion of by-products. By carefully distilling the crude product remaining after distilling off phosphorus oxychloride, phenyl-1,3,3-trichloroisoindolenine distils over at 215°–216° C. under 7–8 mm. pressure. The yield amounts to about 54 parts. During distillation the residue shows a tendency to foam with the evolution of gas and finally decomposes. The distilled portion yields an almost colourless oil of the boiling point 208°–210° C. under 6 mm. pressure by a second vacuum distillation; according to analysis and behaviour the oil represents phenyl-1.1.3-trichloro-isoindolenine (presumably as a mixture of the two possible isomers). By cooling a cyclohexane solution of this product a part crystallizes in colourless rhombs.

We claim:

1. The process for the production of chlorine containing isoindolenines which comprises treating a compound selected from the group consisting of phthalimides, o-cyanobenzoic acids and the acid chlorides o-cyanobenzoic acids with phosphorus pentachloride at temperatures from 80 to 180° C.

2. The process for the production of chlorine containing isoindolenines which comprises treating one mol of a phthalimide with substantially one mol of phosphorus pentachloride at temperatures from 80 to 180° C.

3. The process for the production of chlorine containing isoindolenines which comprises treating one mol of a phthalimide with two to three mols of phosphorus pentachloride at temperatures from 80 to 180° C.

4. The process for the production of chlorine containing isoindolenines which comprises treating phthalimides with phosphorus pentachloride in a solvent indifferent to phosphorus pentachloride, said solvent being selected from the group consisting of phosphorus oxychloride, chlorobenzene and o-dichloro-benzene at temperatures from 80 to 180° C.

5. As new compounds chlorine containing isoindolenines of the general formula

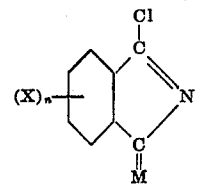

wherein M stands for a substituent selected from the group consisting of O and $Cl_2$, X stands for a substituent selected from the group consisting of H, $NO_2$, Cl, and $C_6H_5$, and $n$ stands for an integer from 1 to 4.

6. As new compound

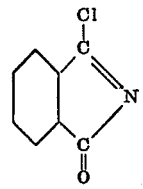

7. As new compound

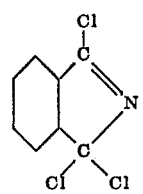

8. As new compounds

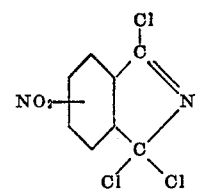

9. As new compound

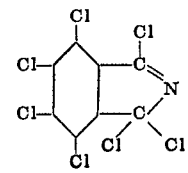

10. As new compounds

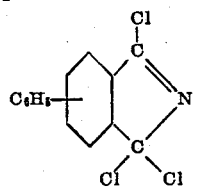

11. The process for the production of 1-amino-3-imino-isoindolenine derivatives which comprises treating 1.3.3-trichloro-isoindolenines with a compound of the general formula:

wherein R and R' stand for a radical selected from the group consisting of hydrogen, a saturated alkyl, a cycloalkyl, and a phenyl radical at temperatures from −30° to +70° C.

12. The process for the production of 1-amino-3-imino-isoindolenine derivatives which comprises treating 1.3.3-trichloro-isoindolenines with a compound of the general formula:

wherein R and R' stand for a radical selected from the group consisting of hydrogen, a saturated alkyl, a cycloalkyl, and a phenyl radical at temperatures from −30° to +70° C. in an organic solvent selected from the group consisting of aromatic and hydroaromatic hydrocarbons and chlorine substituted aromatic hydrocarbons.

References Cited in the file of this patent

Berichte, vol. 12, pp. 456–461.
Beilstein: Handbuch der Organischen Chemie, vol. 21, page 287, citing Le Royer, Annalen, vol. 238, page 356.